April 14, 1953 P. M. HIGGS 2,635,033
RECORDER FOR USE IN MISSILES
Filed Aug. 5, 1947 5 Sheets-Sheet 1

INVENTOR
PAUL M. HIGGS
BY
ATTORNEY

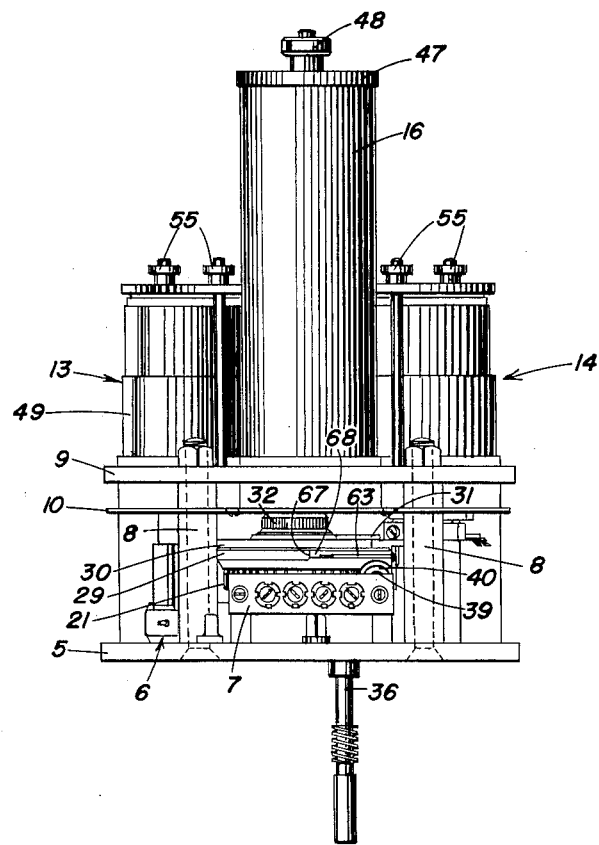
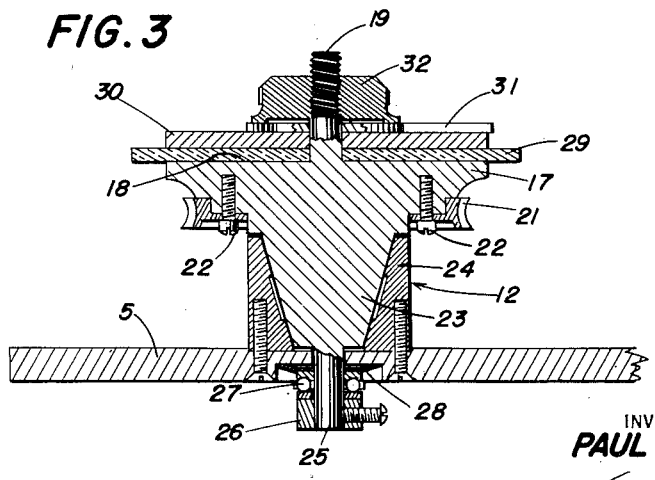

April 14, 1953 P. M. HIGGS 2,635,033
RECORDER FOR USE IN MISSILES
Filed Aug. 5, 1947 5 Sheets-Sheet 3
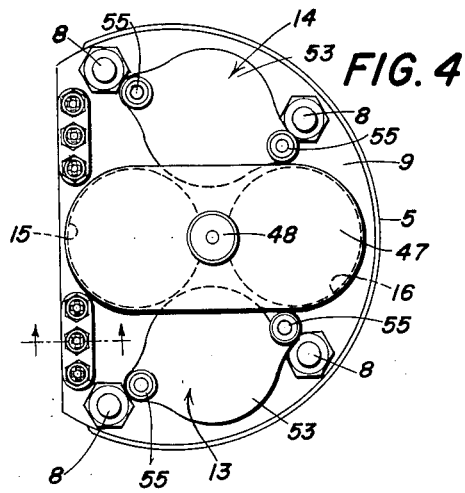
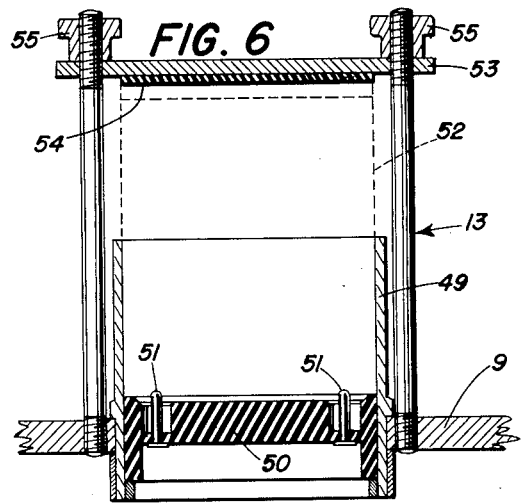
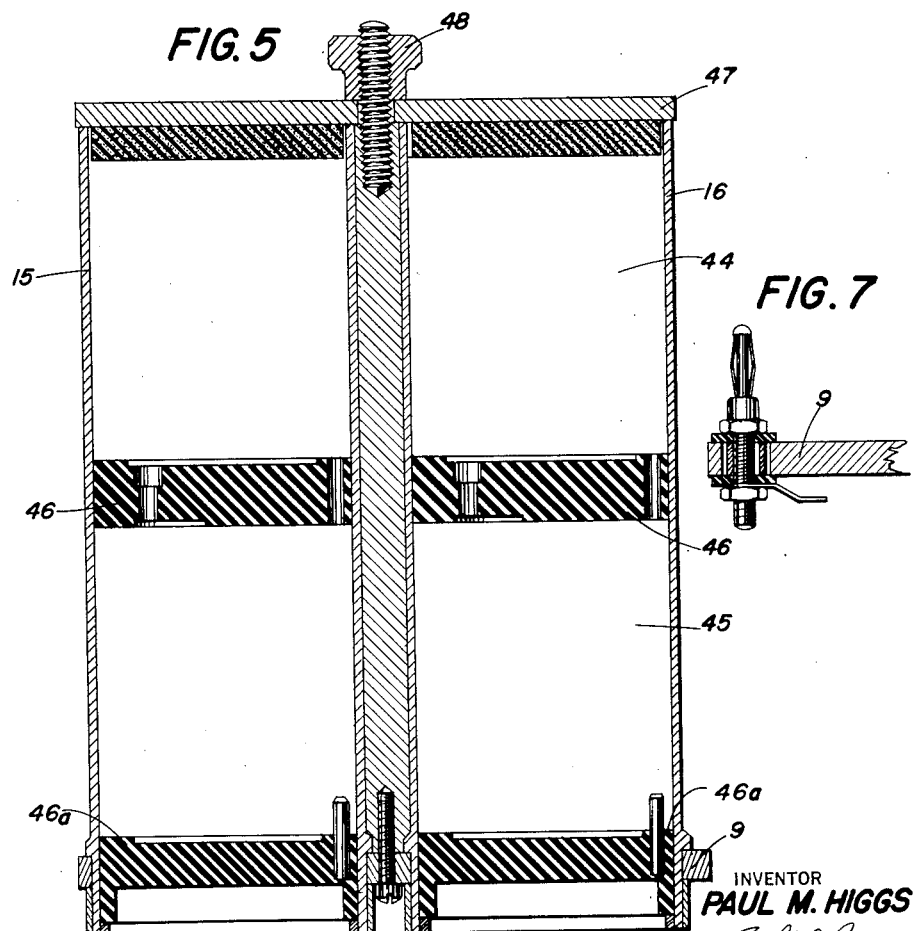
INVENTOR
PAUL M. HIGGS
BY
ATTORNEY April 14, 1953   P. M. HIGGS   2,635,033
RECORDER FOR USE IN MISSILES
Filed Aug. 5, 1947   5 Sheets-Sheet 4

INVENTOR
PAUL M. HIGGS
BY
ATTORNEY

April 14, 1953      P. M. HIGGS      2,635,033
RECORDER FOR USE IN MISSILES
Filed Aug. 5, 1947      5 Sheets-Sheet 5
FIG. 11
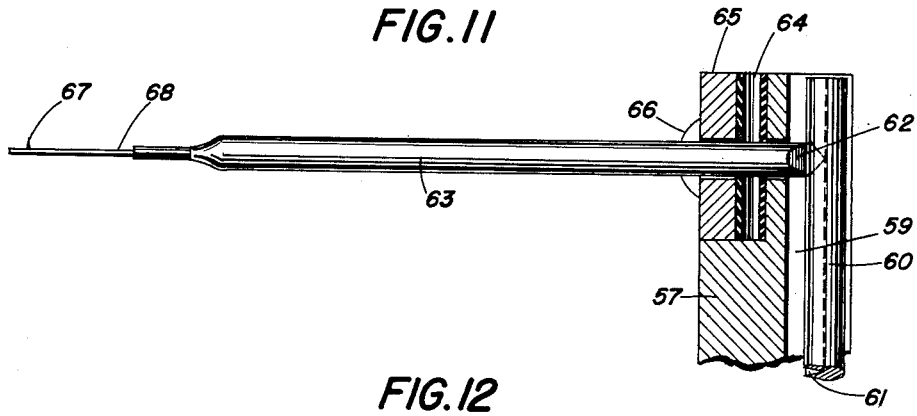
FIG. 12
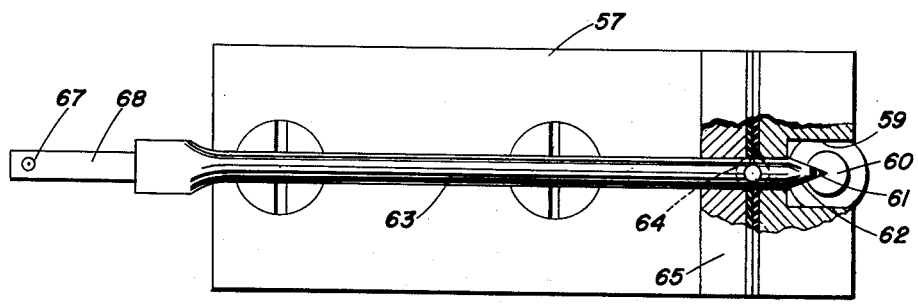
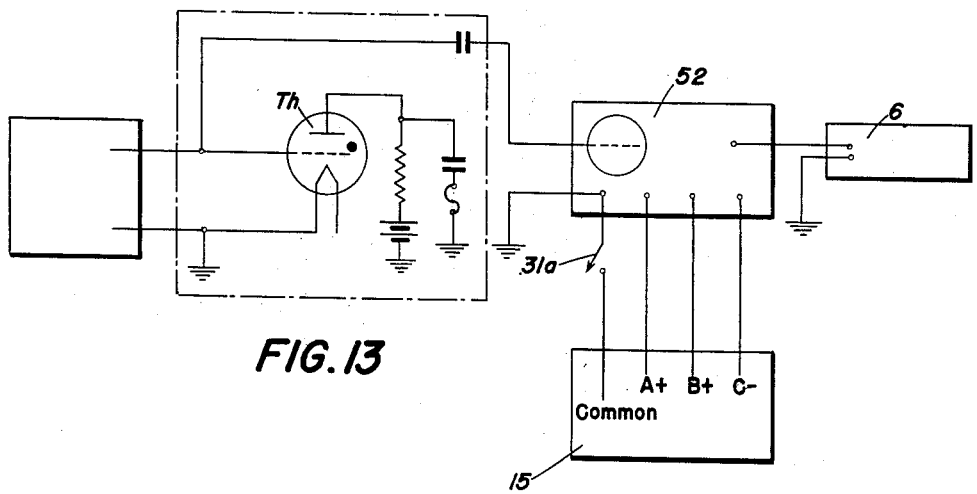
FIG. 13
INVENTOR
PAUL. M. HIGGS
BY
ATTORNEY Patented Apr. 14, 1953

2,635,033

UNITED STATES PATENT OFFICE 2,635,033

RECORDER FOR USE IN MISSILES

Paul M. Higgs, Seattle, Wash., assignor to the United States of America as represented by the Secretary of the Navy Application August 5, 1947, Serial No. 766,198

5 Claims. (Cl. 346—38)

The present invention relates to recording devices, and particularly to an improved automatic recorder of very compact yet rugged construction, which is entirely self-contained, of sensitive character, yet so designed as to be operable to furnish an accurate record even though, and while, the mechanism is subjected to severe vibration.

One of the principal objects of the invention is to provide a recorder of the engraving type by the use of which it will be possible to obtain a record of the signal and background noise present in the electrical components of electronic devices while in operation under conditions such that an observer cannot be present, as for example in the checking of the operation of electrically operated detonating mechanisms of items of ordnance, such as underwater torpedoes.

A related object of the invention is to provide apparatus of this character which is so rugged in construction as to operate properly and accurately in torpedoes dropped from airplanes.

A further object of the invention resides in the provision of such a recorder which occupies a minimum of space and is designed to be fitted to parts now standardized, and to be driven by a standard impeller device incorporated in the arming system for the detonating means of underwater torpedoes as at present constructed.

Other objects of the invention will be evident upon consideration of this disclosure in its entirety.

In the drawings:

Figure 2 is a rear elevational view of the recorder removed from the casing;

Figure 3 is a central vertical sectional view of the turntable and adjacent parts, showing the record;

Figure 4 is a plan of the recorder.

Figure 5 is a vertical sectional view of the battery case.

Figure 6 is a similar sectional view of the amplifier case.

Figure 7 is a sectional detail of an electrical connector;

Figures 11 and 12 are enlarged detail views of the stylus and connected driving parts; and Figure 13 is a block diagram showing the general wiring arrangement.

Figure 1:
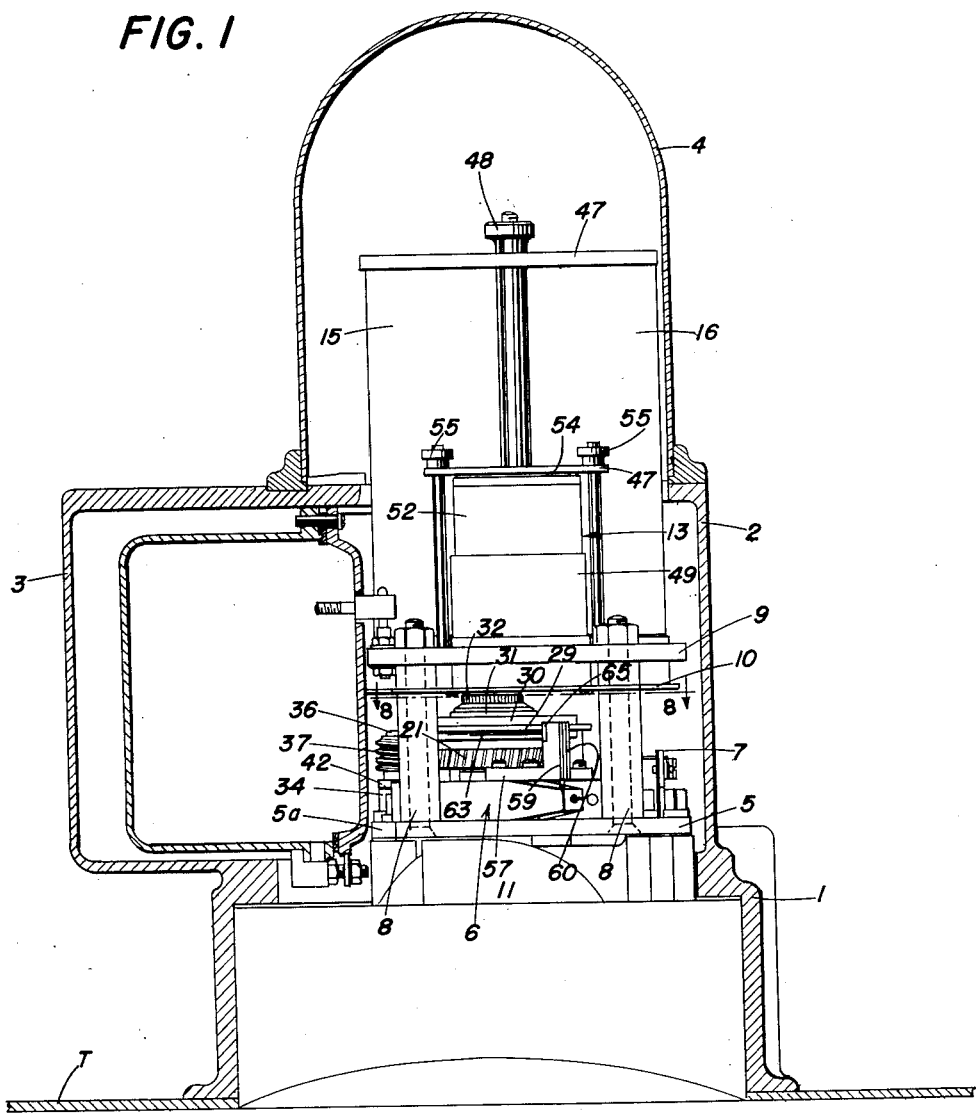
Figure 1 is a side elevation, showing the casing portions in section, of the improved recorder.

Referring now to the drawings in detail, the numeral 1 indicates generally a supporting casting, illustrated as of a type used to support the explorer mechanism of a torpedo. It will be recognized that the improved recorder might be carried and used in any of various manners and locations, the installation shown, designed for the exercise head of a torpedo, being illustrative only. The hull of the torpedo is fragmentarily illustrated at T. An upward extension of the casting defines a housing 2 formed with a forwardly extending compartment 3. The lower end of the casting 1 opens outside the hull and is designed to receive an impeller, which may be in the form of a paddle wheel, not shown, actuable by the water flow past the hull. The open upper end of the cast portion of the housing 2 is provided with a belled cover 4.

A base plate 5 is mounted in the lower end of the housing 2 and is generally circular in shape but formed with a flat side 5a. The base plate carries a reproducing unit 6 which may be of a conventional crystal type used in the cutting of phonograph records, a terminal board 7 and posts 8, which in turn carry the top plate 9 and a switch mounting plate 10. The base plate also provides mounting for the impeller and drive shaft bearing bracket, shown at 11, and for the turntable bearing 12.

Figure 8:
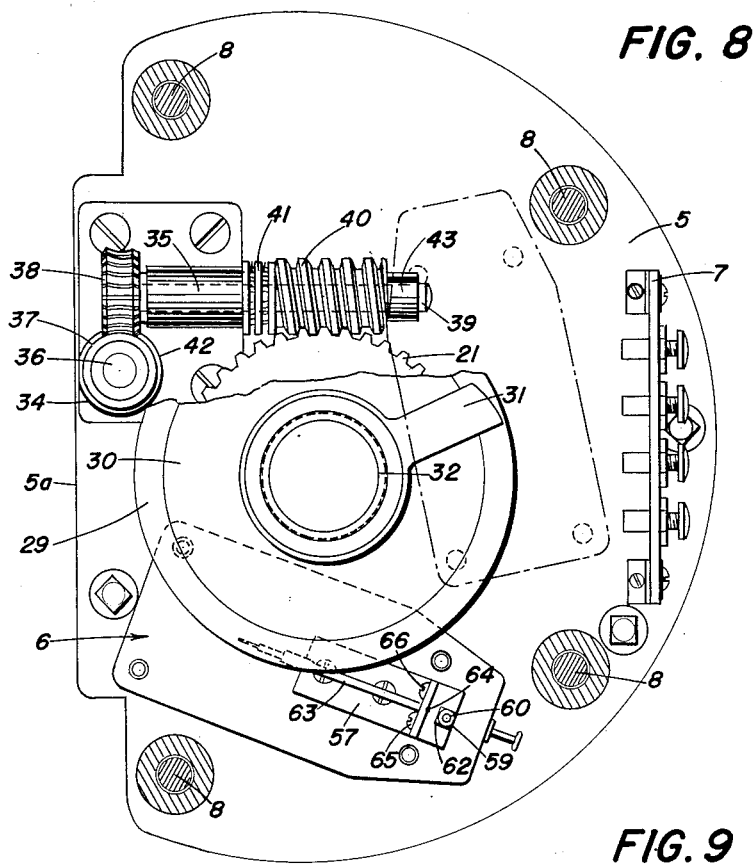
Figure 8 is a fragmentary section taken substantially on the plane 8—8 of Figure 1 and looking in the direction of the arrows.
Figure 10:
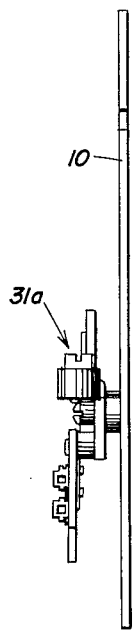
Figure 10 is a side elevation of the switch and plate shown in Figure 9.
Figure 9:
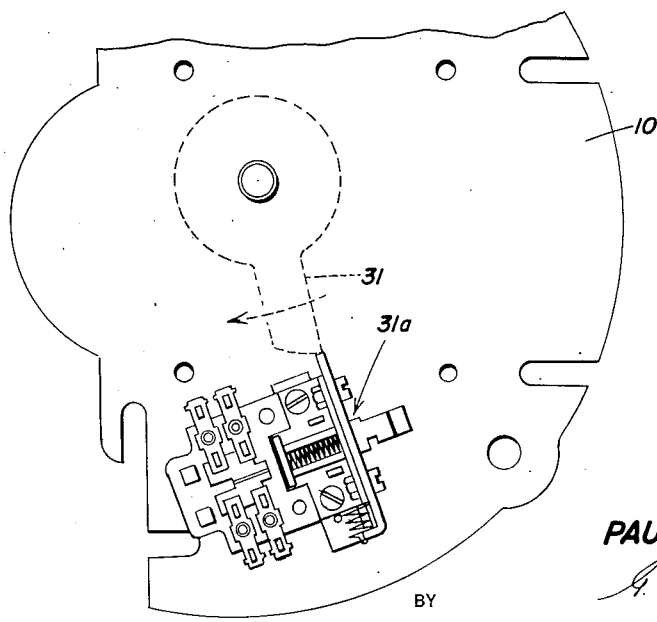
Figure 9 is a bottom view of the switch and baffle plate.

The top plate 9, as shown in elevation in Figures 1 and 2 and in plan in Figure 4, supports booster amplifier cases 13 and 14 and battery cases 15 and 16. These constitute elements of two separate recording systems by means of which signals from two different channels may be recorded on a single record disk at the same time, provided, of course, that two of the crystal recording units 6 are employed. For the sake of simplicity, however, only one recording system will be described in detail (the second recording unit being shown in dot-dash lines in Fig. 8 only). Only one amplifier, one set of batteries and one crystal recording unit will accordingly be considered in connection with the electrical circuit.

Referring to Figure 3, the turntable is indicated at 17 and is provided with a flat upper surface 18 and an axial post 19 designed to receive and position the record 20. The post is threaded to receive a nut 32 by which the record disk is clamped in place. The turntable is drivable by a worm gear 21 of ring form attached thereto by screws 22. Beneath the gear 21 the turntable is tapered to define a conical bearing surface 23 journaled in a bearing 24 which is of conforming hollow conical shape. Beneath the surface 23 there is provided a reduced shaft 25 which projects through the base plate 5 and carries a locking collar 26 at its lower end for preventing upward displacement of the turntable. A thrust bearing 27 and a spring washer 28 cooperate with the bearing 24 to insure smooth rotation of the turntable.

The record disk 29 may be formed of glass and coated, in a manner to be described more fully hereinafter, with a coating of a variety designed to be easily and accurately marked by a suitable scriber. A clamping plate 30 and a sheet metal trip arm 31 are retained upon the post 19 and interposed between the turntable and thumbnut 32.

Rotation is imparted to the turntable 17 from the impeller by suitable gearing and shafting including a shaft 36, operatively connected with the impeller and journaled in the bearing 34, a worm 37 carried by such shaft and meshing with a pinion 38 on a cross shaft 39, and a worm 40 on the cross shaft meshing with worm wheel 21 attached to the turntable. Shaft 39 is journaled in the bearings 35, 43. A thrust bearing 41 is interposed between worm 40 and bearing 35. A collar 42 prevents upward displacement of the shaft 36.

The trip 31, which is rotated with the turntable, is so designed that, after a predetermined number of revolutions of shaft 36 by the impeller, the free end of said trip will engage the release-lever of a spring switch 31a which is mounted on the under surface of the plate 10 and which will when so actuated function to close the filament and anode voltage supply circuits to the amplifier, as will be described hereinafter.

The battery cases 15 and 16 are of circular cross section and may be identical, one being provided for each recorder, as indicated. Each includes vertically spaced compartments 44 and 45 (Fig. 5) the compartments being provided with socketed receptacles as 46 at their lower ends to receive the battery contact pins. The two battery cases are held in place by a clamping plate 47 and tie bolts and nuts 48.

The amplifier case, shown in Figure 6, comprises a guide tube 49 and a receptacle 50 fitted with contact pins 51 for receiving an electron tube amplifier of unitary construction, shown in dotted lines at 52. To retain the amplifier unit 52 in place, there are provided a clamping plate 53, having a cushion of rubber 54 on its under face, and tie bolts and nuts 55.

The recorder unit includes the crystal unit 6, which is designed to oscillate the scriber arm 63 laterally when supplied with a suitable modulated or alternating voltage. The internal construction of the crystal recorder unit may be conventional and needs no detailed description. The unit is attached to plate 5 and is secured to the upper face of said unit. The vertical leg of the bracket is formed with a slot 59 which receives the driving pin 60 of the crystal unit. Near its upper end the pin is formed with a V-shaped groove 61 which is designed to receive the pivot point 62 of the scriber arm 63. The scriber is mounted for lateral oscillatory movement by a pin 64 which is confined in mating grooves in the upper end of the bracket 57 and in a clamping block 65 by screws 66 which extend through said block into said bracket. Rubber liners are placed on the confronting faces of the clamping block and bracket, and extend into the grooves, so that proper tension may be placed on the pivot pin 64. The scriber arm 63 carries a conical scriber point receiving stylus 67 which is resiliently mounted by a spring 68 and which is normally engaged with the surface of the record or disk 29 secured to the turntable 17.

It will be understood that when an electrical impulse is received by the crystal unit 6, the driving arm will be rocked, imparting oscillatory movement to the scriber 63, with the result that the stylus will be moved over the face of the record disk 29, scratching a trace on its surface.

The manner of processing the record disk 29 so that movement of the stylus thereon will produce a fine and accurate trace of satisfactory characteristics is exacting in that altho a generally conventional silvering process is employed such as is used upon mirrors, the coating must be a soft one of easily scribed, uniform character. First the record blank is cleaned in any suitable manner, such as the following: Fingerprints and similar deposits may first be removed with a cleaning solution. The record disk is then placed in a glass dish and covered with acid bichromate solution, then rinsed. The surface of the disk is then wetted with a small quantity of a dilute "Aerosol" solution or other suitable wetting agent. A tuft of cotton, moistened with such solution and loaded with precipitated chalk is then applied to the disk or record blank; the disk is then rinsed thoroughly and, following said rinsing step, the disk is covered with concentrated stannous chloride solution for a period of fifteen seconds. Following this the disk is rinsed thoroughly and allowed to stand in the glass dish.

The solutions listed below are prepared:

Solution #1:
  Water—500 cc. (tap water)
  Silver nitrate—5 grains
  Ammonia solution—one part ammonia and 9 parts water.

The ammonia solution is added slowly to the silver nitrate solution, with constant stirring until first form is dissolved. The solution should be slightly turbid and yellow or straw colored, and is then filtered through rapid filter paper.

Solution #2:
  Water—500 cc.
  U. S. P. formaldehyde solution—50 cc.

The above solutions are combined substantially as follows:

¼ part of solution No. 2 (approximately 3 cc.) is added quickly to solution No. 1 (1 part solution No. 1 (10 cc.)) to 6 parts tap water (60 cc.) at room temperature, and shaken for a few seconds. Meanwhile the liquid is poured off of the record disk in the glass dish, and the record is lifted from the dish with a photographic stirring rod or other suitable instrument. The coating solution (solutions No. 1 and No. 2 combined, as above described) is poured into the dish and the record disk dipped into the solution. The silver coating will be completed in from 5 to 8 seconds. The disk is then flooded with tap water to arrest the silver coating process. As a final step the record disk is rinsed successively in two dishes of alcohol and stood on edge or spun to dry.

A record disk 29 coated in the manner above described has a soft surface which permits the engraving by the stylus 6 of a clearly readable trace or record when the turntable 17 is rotated.

In the block diagram of Figure 13, the general wiring arrangement is shown. The grid of the gas discharge tube Th of the thyratron type which is fired when the fuzing mechanism is to be detonated is connected to the input of the amplifier 52. It should be understood that the amplifier 52 operates merely as a single stage voltage amplifier to step up the output voltage of the amplifier used in the fuzing mechanism to such a value that it will operate the crystal unit 6. The output of amplifier 52 is connected to the unit 6. Suitable batteries (not shown) are contained in the case 15 and connected to the amplifier to supply electricity at the proper anode, filament and bias voltages therefor. The switch 31a is connected in a common lead and functions to turn on and off all energy supplies to the amplifier simultaneously.

When a test torpedo containing the improved recorder is fired, the impeller will cause the turntable 17, with the record blank 29 thereon, to turn. The trip arm 31 is set so that the free end thereof will release the switch 31a to permit the latter to close and energize the amplifier 52 after the turntable has rotated through a few degrees. In this connection it should be understood that the trip arm may be set to release the switch 31a at any desired time during the torpedo run. In other words, the turntable ordinarily rotates once in (approximately) every six minutes, so that the switch may be caused to close the amplifier circuit at any desired time during the test run.

Operation of the impeller also causes operation of switches closing the circuits to the influence operated detonating mechanism by structure which forms no part of this invention and which, therefore, has not been shown. The amplifier and thyratron unit (discharge tube) of said detonating mechanism are mounted in a metal container in the compartment 3 and electrical connections to the recorder are made by banana plugs in sockets in the terminal board shown in Figures 2 and 3. When a signal or impulse is fed to the grid of the gas discharge tube said impulse will be fed to the input of the amplifier 52 and from the output of said amplifier to the crystal unit 6, causing a trace to be engraved on the record disk 29 as the turntable 17 rotates. This trace will indicate the amplitude of the background noise and the impulse and will, therefore, give an indication of signal to noise ratio up to, and subsequent to, the time the gaseous discharge tube in said detonating mechanism is caused to conduct. In addition said trace will, of course, give a graphic description of the conduct of the torpedo exploder mechanism during the test run.

What is claimed is:

1. The combination with an ordnance missile having a signal source for actuating an electrically operable detonating mechanism and having rotatable means carried by the missile, of recording means operating by the rotatable means for recording the signal and background noise generated by said signal source, said recording means including a rotatable disk, means for mounting said disk for rotation, said mounting means making firm contact with the major portions of the opposite faces of said disk for causing said disk to rotate, a crystal unit having a driving pin formed with a groove, said crystal unit being designed to be electrically connected to said signal source, a bracket on the crystal unit and having a leg extending substantially parallel to the axis of rotation of said disk and formed with a slot for receiving said driving pin, a scriber arm having a pivot point engaged in the groove, a stylus resiliently mounted on said scriber arm, means mounting the scriber arm for lateral oscillatory movement on said leg of said bracket, and switching means for establishing electrical connection between said crystal unit and said signal source only after said disk has moved a predetermined amount, said stylus describing a trace on said disk representative of the signal and background noise generated by said signal source.

2. The arrangement recited in claim 1, wherein the means for mounting the disk for rotation includes a turntable having a conical bearing surface, a conical bearing journaling said bearing surface, releasable clamping means for retaining the disk on said turntable, and gearing means for transmitting rotative movement from said rotatable means to said turntable.

3. The combination with an ordnance missile having a signal source for actuating an electrically operable detonating mechanism and having rotatable means carried by the missile, of recording means for recording the signal and background noise generated by said signal source, said recording means including a rotatable record disk, a turntable engaging a major portion of one face of said disk and having a conical bearing surface, a conical bearing journaling said bearing surface, releasable clamping means engaging a major portion of the other face of said disk for retaining said disk on said turntable, gearing means for transmitting rotative movement from said rotatable means to the turntable, an amplifier electrically connected to the signal source, a power source for energizing said amplifier, switching means electrically connected between said power source and said amplifier, a trip associated with said switching means and secured to said turntable for rotation thereby, said trip actuating said switch to initiate the energization of said amplifier after the turntable has rotated a predetermined amount, a crystal unit electrically connected to the output of said amplifier and having a driving pin formed with a groove, a bracket mounted on said crystal unit and having a leg extending substantially parallel to the axis of rotation of said turntable, said leg having a slot for receiving said driving pin, a scriber arm having a pivot point engaged in the groove of said driving pin, and a stylus resiliently mounted on said scriber arm and in engagement with said record disk for inscribing a trace representative of the signal and background noise produced by said signal source.

4. In an ordnance missile, the combination including a signal source, an electrically operable detonating mechanism connected to the output of said signal source, an amplifier connected to the output of said signal source, a power supply for energizing said amplifier, a crystal unit connected to said amplifier, means for rotatably mounting a record disk, and a stylus operatively connected to said crystal unit and engaging said disk to inscribe thereon a trace indicative of the signal output of said signal source and the instant of actuation of said detonating mechanism.

5. In an ordnance missile, the combination including a signal source, an electrically operable detonating mechanism connected to the output of said signal source, an amplifier connected to the output of said signal source, a power supply for energizing said amplifier, a crystal unit connected to said amplifier, said crystal unit having a driving pin formed with a groove, means for rotatably mounting a record disk, a bracket on said crystal unit having a leg formed with a slot for receiving said driving pin, a scriber arm having a pivot point engaged in the groove of said driving pin, and a stylus resiliently mounted on said scriber arm, said stylus engaging said disk to inscribe thereon a trace indicative of the signal output of said signal source and the instant of actuation of said detonating mechanism.

PAUL M. HIGGS.

References Cited in the file of this patent

UNITED STATES PATENTS

| Number | Name | Date |
|---|---|---|
| 689,650 | Moriarty | Dec. 24, 1901 |
| 916,572 | Mettegang | Mar. 30, 1909 |
| 926,763 | Phillips | July 6, 1909 |
| 1,152,493 | Dieter | Sept. 7, 1915 |
| 1,241,213 | Heisler | Sept. 25, 1917 |
| 1,404,422 | Barr et al. | Jan. 24, 1922 |
| 1,409,788 | Schon | Mar. 14, 1922 |
| 1,489,566 | Webster | Apr. 8, 1924 |
| 1,620,224 | Palmer | Mar. 8, 1927 |
| 1,669,170 | Nicholson | May 8, 1928 |
| 1,857,959 | Isler | May 10, 1932 |
| 2,135,028 | Bokovoy et al. | Nov. 1, 1938 |
| 2,278,680 | Thompson | Apr. 7, 1942 |
| 2,328,478 | Mason | Aug. 31, 1943 |
| 2,404,975 | Mathes | July 30, 1946 |
| 2,516,860 | Erickson | Aug. 1, 1950 |